(12) United States Patent
Folayan

(10) Patent No.: US 9,785,990 B2
(45) Date of Patent: Oct. 10, 2017

(54) ONLINE SHOPPING SYSTEM AND METHOD FACILITATING FOREIGN TRANSACTIONS

(71) Applicant: Chris Folayan, Modesto, CA (US)

(72) Inventor: Chris Folayan, Modesto, CA (US)

( * ) Notice: Subject to any disclaimer, the term of this patent is extended or adjusted under 35 U.S.C. 154(b) by 337 days.

(21) Appl. No.: 13/975,288

(22) Filed: Aug. 24, 2013

(65) Prior Publication Data

US 2015/0058165 A1 Feb. 26, 2015
US 2016/0155169 A9 Jun. 2, 2016

Related U.S. Application Data

(60) Provisional application No. 61/694,068, filed on Aug. 28, 2012.

(51) Int. Cl.
*G06Q 30/00* (2012.01)
*G06Q 30/06* (2012.01)
*G06Q 20/12* (2012.01)

(52) U.S. Cl.
CPC ......... *G06Q 30/0613* (2013.01); *G06Q 20/12* (2013.01); *G06Q 30/0633* (2013.01); *G06Q 30/06* (2013.01)

(58) Field of Classification Search
CPC .............................. G06Q 30/06; G06Q 30/08
USPC ................................................ 705/26.1–27.2
See application file for complete search history.

(56) References Cited

U.S. PATENT DOCUMENTS

| | | | |
|---|---|---|---|
| 7,536,360 B2 | 5/2009 | Stolfo | |
| 7,853,480 B2 * | 12/2010 | Taylor et al. | ................... 705/22 |
| 7,949,572 B2 | 5/2011 | Perrochon | |
| 2002/0087430 A1 | 7/2002 | Davis et al. | |
| 2007/0112664 A1 | 5/2007 | Zhang et al. | |
| 2008/0059370 A1 | 3/2008 | Sada | |
| 2009/0138379 A1 * | 5/2009 | Scheman | ........... G06Q 30/0601 705/26.1 |
| 2011/0264558 A1 | 10/2011 | Alexandrou | |

FOREIGN PATENT DOCUMENTS

| | | |
|---|---|---|
| WO | 01/88805 A1 | 11/2001 |
| WO | 02/29508 A2 | 4/2002 |

* cited by examiner

*Primary Examiner* — Ethan D Civan
*Assistant Examiner* — Ming Shui
(74) *Attorney, Agent, or Firm* — Nwamu, P.C.

(57) ABSTRACT

Global shoppers may access numerous predetermined online shopping websites. Users can shop normally and can generate a third-party cart. Foreign shipping addresses and foreign payment types may be accepted.

10 Claims, 15 Drawing Sheets

FIG. 13

ONLINE SHOPPING SYSTEM AND METHOD FACILITATING FOREIGN TRANSACTIONS

CLAIM OF PRIORITY

The present application claims priority from U.S. Provisional Patent Application No. 61/694,068, filed Aug. 28, 2012.

COMPUTER PROGRAM LISTING APPENDIX

A computer program listing appendix is provided via EFS with this application. The information is hereby incorporated by reference as if set forth in full in this application for all purposes. A portion of the disclosure recited in this application contains material which is subject to copyright protection. Specifically, the computer program listing appendix and possibly other portions of the application may recite or contain source code, data or other functional text. The copyright owner has no objection to the facsimile reproduction of the functional text; otherwise all copyright rights are reserved.

BACKGROUND OF THE INVENTION

The present invention relates generally to communication systems and methods and more specifically to communication systems and methods for facilitating online shopping.

The Internet is global and many e-commerce websites such as AMAZON™, MACY'S™, RALPH LAUREN™, VICTORIA'S SECRET™, etc., are accessible to shoppers all over the world. A typical user or shopper located in the U.S., for example, can initiate shopping by accessing a desired shopping website to browse and purchase items available for sale.

The user can browse and select items that are desirable for purchase. The selected items can thereafter be placed in a shopping cart or the like to accumulate all of the items that are purchased. After selection of the desired items is complete, the user can typically enter a shipping address where the goods are to be shipped. The user also enters a payment type such as a credit card or the like to complete the transaction. Once the shipping address and the credit card information are entered, the order is usually processed after which the purchased items are shipped to the user.

In other instances, however, the shopper may be located outside the geographical shipping boundary of the shopping website since many e-commerce sites do not ship items to certain geographic location. As an example, the user may be located in Nigeria, Armenia, Belize, etc. or other areas typically outside a geographical shipping area of a particular shopping website.

In such a case, after selection of desired items, the user similarly proceeds to enter a native shipping address. In response, the shopping website typically rejects the native address and prompts the shopper for an address within the shopping website's geographical shipping area.

Since the shopper does not reside within the geographical shipping area, the shopper cannot purchase items available for sale on the shopping website and ultimately the shopper becomes despondent. Although the shopper might seek and locate a different shopping website without such a shipping restriction, the items offered for sale by the different shopping website may not necessarily be as desirable as those items found on the shopping website with shipping restrictions.

Similarly, to pay for selected items, the shopper usually enters a payment type that is typically unacceptable or is not a payment type accepted by the shopping website. Upon entering such a payment type, the shopping website immediately rejects the payment type, again leaving the shopper with no suitable alternative but to discontinue shopping.

It is within the aforementioned context that a need for the present invention has arisen. Thus, there is a need to address one or more of the foregoing disadvantages of conventional systems and methods, and the present invention meets this need.

BRIEF SUMMARY OF THE INVENTION

Various aspects of an online shopping system and method facilitating foreign transactions can be found in exemplary embodiments of the present invention.

In a first embodiment, available at www.mallforafrica-plus.com, the system aggregates numerous online shopping websites for access by shoppers globally. Each shopping website is selected from independent third-party shopping websites configured to reject or prevent a shopper from completing a transaction when a foreign shipping address beyond the shopping website's geographical shipping jurisdiction is entered by the shopper.

Upon launch, the system displays an aggregation of links or representations thereof that correspond to the shopping websites. Each link selected by a shopper directs the shopper to the corresponding single shopping website, where the shopper can begin to shop as the shopper would normally do.

The system displays items for purchase placed in a shopping cart of the shopping website, acquires the items for sale from the shopping cart and then generates a third-party shopping cart. The items for purchase are used to populate the third-party shopping cart. Here, this third-party shopping cart is configured to receive the foreign shipping address rejected by the single shopping website.

The third-party shopping cart also uses the foreign shipping address to calculate a total fee for purchasing and shipping the items from the seller to the foreign shipping address. The third-party shopping cart also receives a foreign payment type typically rejected by the shopping website. The system then uses a local shipping address and local payment type to consummate the transaction and to receive and to schedule shipping of the purchased item(s) to the foreign address.

A further understanding of the nature and advantages of the present invention herein may be realized by reference to the remaining portions of the specification and the attached drawings. Further features and advantages of the present invention, as well as the structure and operation of various embodiments of the present invention, are described in detail below with respect to the accompanying drawings. In the drawings, the same reference numbers indicate identical or functionally similar elements.

BRIEF DESCRIPTION OF THE DRAWINGS

FIG. 13 illustrates a shopping browser showing a place order form according to an exemplary embodiment of the present invention.

DETAILED DESCRIPTION OF THE INVENTION

Reference will now be made in detail to the embodiments of the invention, examples of which are illustrated in the accompanying drawings. While the invention will be described in conjunction with the preferred embodiments, it will be understood that they are not intended to limit the invention to these embodiments. On the contrary, the invention is intended to cover alternatives, modifications and equivalents, which may be included within the spirit and scope of the invention as defined by the appended claims. Furthermore, in the following detailed description of the present invention, numerous specific details are set forth to provide a thorough understanding of the present invention. However, it will be obvious to one of ordinary skill in the art that the present invention may be practiced without these specific details. In other instances, well-known methods, procedures, components, and circuits have not been described in detail as to not unnecessarily obscure aspects of the present invention.

Figure 1:
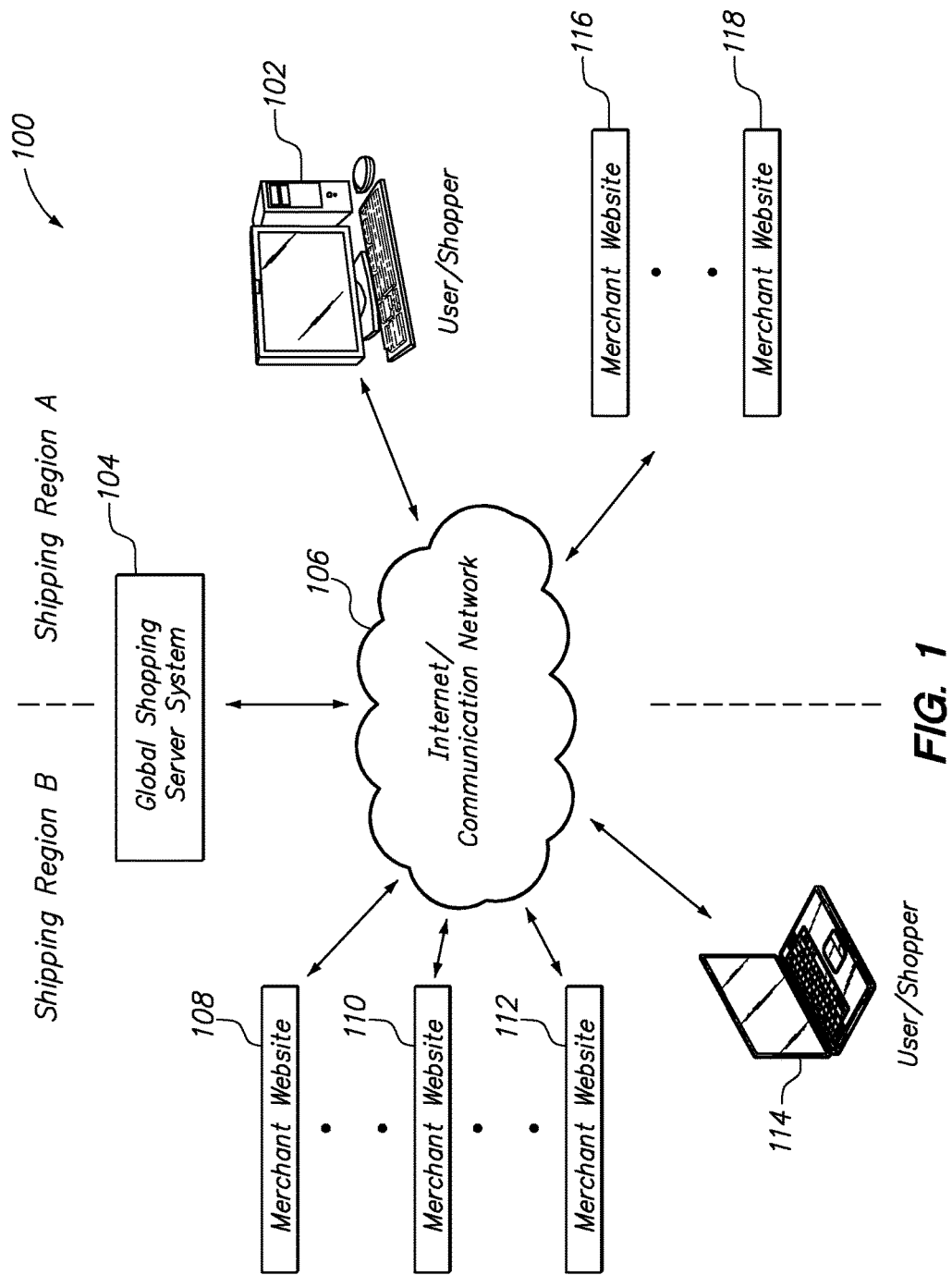
FIG. 1 illustrates an online global shopping server system according to an exemplary embodiment of the present invention.

FIG. 1 illustrates online global shopping system 100 according to an exemplary embodiment of the present invention.

In FIG. 1, online global shopping system 100 comprises user (shopper) 102 communicably coupled to global shopping server system 104 via Internet/communication network 106. Although illustrated as a desktop computing device, user 102 may be a person using such a desktop computing device for shopping. Such a computing device would typically include one or more processors and corresponding memory (not shown). Here, Internet/communication network 106 may be any communication network, wired or wireless that allows data transfer from one point to another.

In FIG. 1, online global shopping system 100 further comprises a plurality of merchant websites namely merchant website 108, merchant website 110 and merchant website 112, all of which are also communicably coupled to global shopping server system 104 as well as user 102 via Internet/communication network 106. User 102 can utilize global shopping server system 104 to facilitate access to a shopping website served up by merchant website 108, merchant website 110 or merchant website 112.

Here, global shopping server system 104 facilitates shopping by user 102 on merchant websites 108, 110 and 112 even though user 102 is located in shipping region A, which is beyond the geographical shipping boundary of merchant websites 108, 110 and 112. As shown, the geographical shipping boundary of merchant websites 108, 110 and 112 is shipping region B.

Note, however, that user 102 can shop at merchant website 116 and merchant website 118 without employing global shopping server system 104 because the user is within the shipping region A. Thus, conventionally, merchant website 116 and merchant website 118 can ship goods to user 102 located within its geographical shipping boundary, shipping region A. However, merchant websites 116 and 118 will not ship goods to user (shopper) 114 located in a different geographical shipping area.

Similarly, traditionally, merchant website 108, merchant website 110 and merchant website 112 are located in shipping region B and do not ship products or items purchased via its website to user 102 located in shipping region A, which is beyond their geographical shipping boundary.

Thus, global shopping server system 104 facilitates shopping across geographical shipping boundaries. As will be further discussed, global shopping server system 104 also facilitates shopping by permitting acceptance of foreign payment types that would ordinarily not be accepted by certain shopping websites.

In FIG. 1, online global shopping system 100 also comprises user 114 communicably coupled to merchant websites 116 and 118 via global shopping server system 104. Global shopping server system 104 facilitates shopping between user 114 and merchant websites 116, 118 since the user and merchants are located in different geographical shipping areas, wherein such shopping would otherwise not occur without global shopping server system 104.

Referring to FIG. 1, note that while user 102 has been depicted as conducting shopping from a location outside the geographical shipping area of merchant websites 108, 110, 112, this shopping may be conducted on behalf of user 102 by a user/device located within the geographical shipping area of each merchant website.

Use and operation of the present invention will be described with reference to FIGS. 2A-15B below.

Figure 2A:
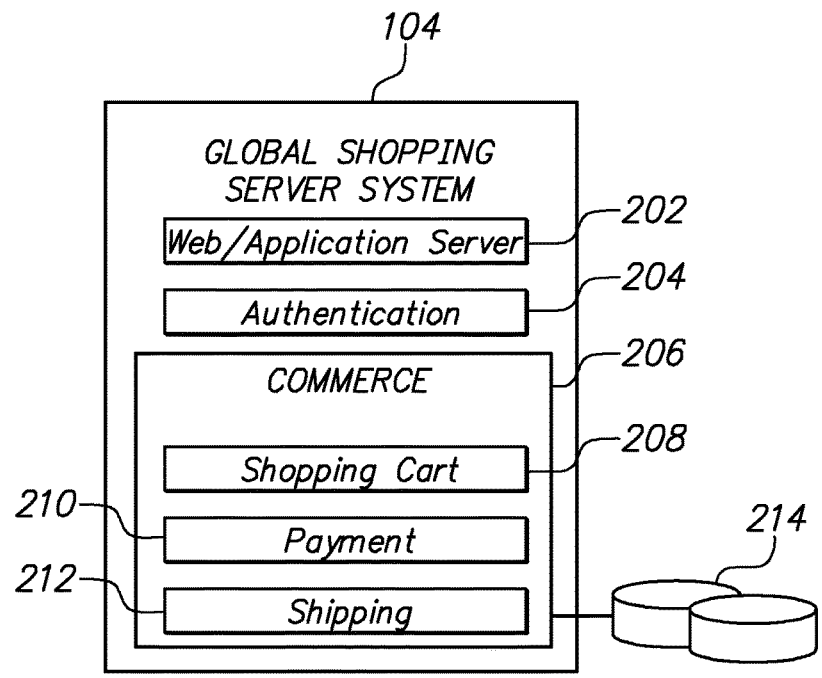
FIG. 2A illustrates a global shopping server system and its components according to an exemplary embodiment of the present invention.

FIG. 2A illustrates global shopping server system 104 and its components according to an exemplary embodiment of the present invention.

In FIG. 2A, global shopping server system 104 comprises web/application server 202 that responds to HTTP (Hyper- TextTransportProtocol) requests from users and shoppers and might provide software abstractions for commonly used services. As an example, upon request from user 102, web/application server 202 might serve up a webpage with an aggregation of links for a plurality of shopping websites. User 102 may then select a desired link to initiate online shopping.

Web/application server 202 might be solely hardware, software or a combination of both. Although not shown, one skilled in the art will realize that other comparable means for performing the functionality of web/application server 202 may be employed.

In FIG. 2A, global shopping server system 104 also comprises authentication module 204 that validates user access to online global shopping system 100. Authentication module 204 might register user 102, generating a user ID, password and storing other personal information to create a personal profile for user 102. A foreign shipping address to which purchased goods can be shipped is also included in such a personal profile. Authentication module 204 can authenticate previously registered users and validate their rights to access the network to conduct shopping for desired items.

In FIG. 2A, global shopping server system 104 also includes commerce module 206 that facilitates payment by user 102 for purchases made by said user. Commerce module 206, itself, includes shopping cart module 208, payment module 210 and shipping module 212.

Shopping cart module 208 generates shopping cart 1002 (FIG. 10) in order to consummate shopping transactions as will be further described below. Note that shopping cart 1002 is a third-party shopping cart that is generated independent of the shopping cart associated with a shopping website on which user 102 is shopping.

In FIG. 2A, payment module 210 accepts and processes payments from user 102 and appropriately debits a user account for purchases. Payment module 210 typically includes one or more lines of software code configured to process payment types such as credits cards, web cards and local currency that are unacceptable to shopping websites outside of the shopping website shipping jurisdiction.

Shipping module 212 coordinates shipping of items to the foreign address of user 102. Global shopping server system 104 also includes data store 214 for storing a plurality of information including but not limited to names, addresses, payment information, link information, etc. All components hereinbefore mentioned might be solely hardware, software or a combination of both. Components might include computer coding languages based on C++, HTML, XML, for example.

Figure 2B:
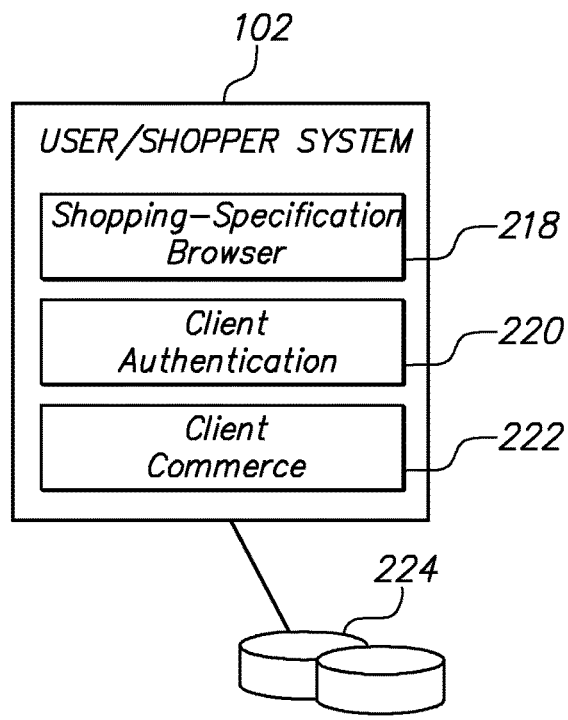
FIG. 2B illustrates a user/shopper system according to an exemplary embodiment of the present invention.

FIG. 2B illustrates user 102 desktop computing device and its components according to an exemplary embodiment of the present invention.

In FIG. 2A, user 102 includes shopping-specific browser 218 and client authentication module 220 that operate with authentication module 204 (FIG. 2A) to validate user access to the network. User 102 also includes client commerce module 222 operating with commerce module 206 (FIG. 2A) to facilitate payment for purchased goods.

User 102 also includes data store 224 that might store payment information, authentication information or other relevant user information. Although data store 224 is shown as being externally connected to user 102, data store 224 may be internal and may represent memory of file and the like.

In use, user 102 begins by contacting global shopping server system 104 to download shopping-specific browser 218. Shopping-specific browser 218 is a novel shopping-specific browser. Unlike traditional browsers that can access any site by entering a URL for that site, shopping-specific browser 218 is configured to access only predetermined shopping websites that are compatible with and operable with shopping-specific browser 218; shopping browser-specific 218 has been specifically coded to operate with said predetermined websites. Such predetermined shopping websites so far include AMAZON.COM™, MACYS.COM™, RALPHLAUREN.COM™, VICTORIASSECRET.COM™, for example.

In one embodiment, over 70 shopping websites that users can access are predetermined and included in shopping-specific browser 218. One skilled in the art will realize that shopping-specific browser 218 may include access to either more or fewer shopping websites for user access.

After shopping-specific browser 218 is downloaded, user 102 may register with global shopping server system 104 to provide a username, password and other authentication information. Authentication module 204 creates a user account and shares the authentication data with client authentication module 220. Upon completion of download of shopping-specific browser 218 and registration of user 102, shopping-specific browser 218 can be launched to display a user interface as illustrated with reference to FIG. 3.

Figure 3:
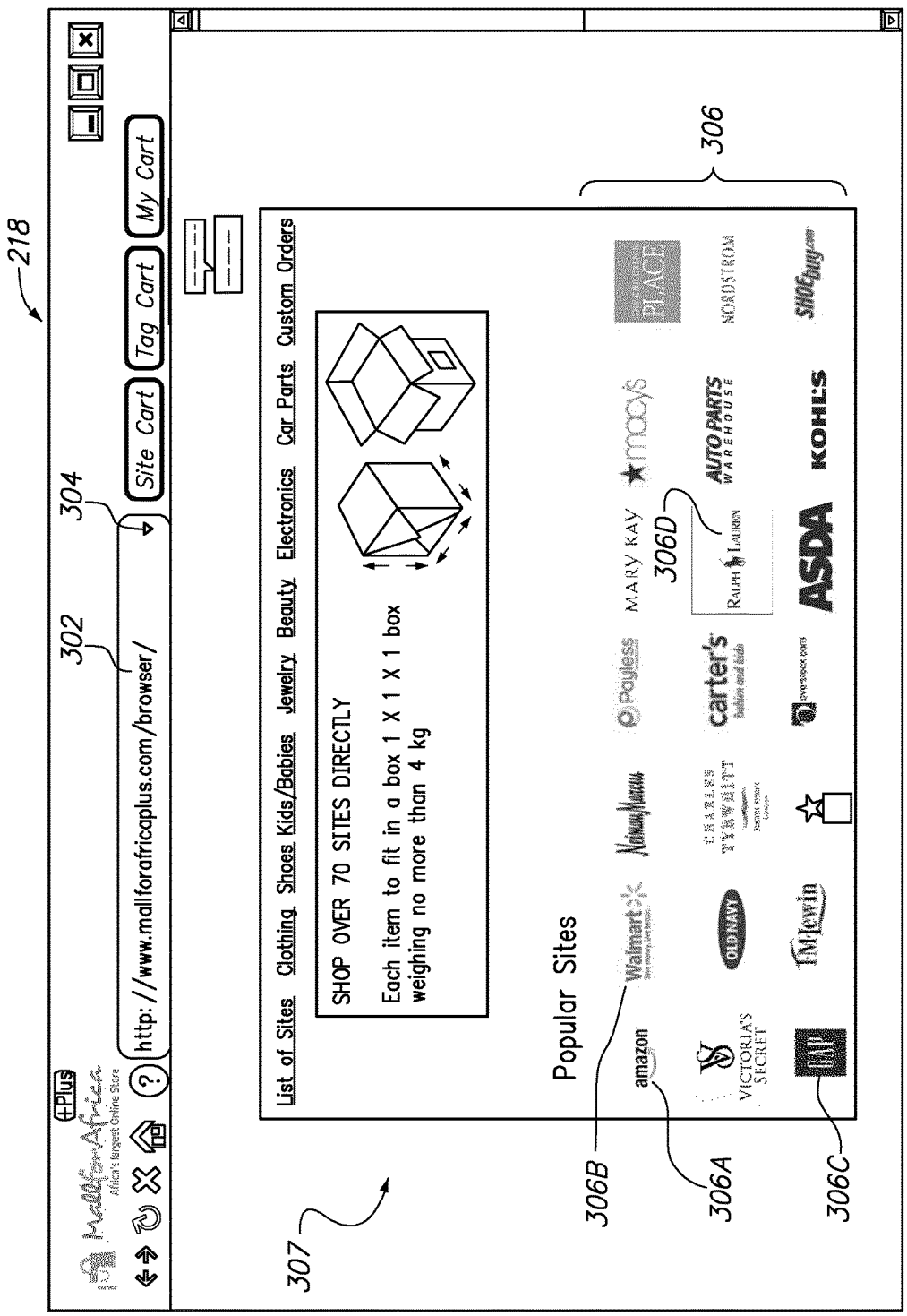
FIG. 3 illustrates a screen shot of a shopping browser according to an exemplary embodiment of the present invention.

FIG. 3 illustrates a screen shot of shopping-specific browser 218 (FIG. 2B) according to an exemplary embodiment of the present invention.

In FIG. 3, shopping-specific browser 218 has been launched by user 102. Shopping-specific browser 218 includes address bar 302 that functions to indicate the URL of a destination shopping website. Shopping-specific browser 218 also includes drop-down button 304 which, upon selection by user 102 (FIG. 1), displays a plurality of shopping website URLs that are associated with shopping-specific browser 218.

Specifically, shopping-specific browser 218 includes an aggregation of links, represented by thumbnails 306, for a plurality of shopping websites. Thumbnails 306 are displayed in main display area 307 of shopping-specific browser 218. In one embodiment, the availability of aggregation of links represented by thumbnails 306 is determined by web/application server 202 of FIG. 2A.

In FIG. 3, selection of each thumbnail 306 launches the corresponding website associated with that thumbnail. Here, as can be seen, shopping-specific browser 218 provides direct access, in one embodiment, to over 70 shopping websites and facilitates shipping from such shopping websites to a foreign shipping address of the user 102.

As shown in FIG. 3, access to popular shopping websites incorporated herein include AMAZON.COM™ via thumbnail 306A, WALMART.COM™ via thumbnail 306B, GAP.COM™ vial thumbnail 306C and RALPHLAUREN.COM™ via thumbnail 306D and a plurality of other sites as shown. Note that each shopping website here is independent of other shopping websites.

Thus, merchant website 108 may be AMAZON.COM™ while merchant website 110 may be WALMART.COM™, which is unaffiliated with AMAZON.COM™. Further, merchant website 112 may be GAP.COM™, all of said aforementioned merchant websites are available via shopping-specific browser 218.

In FIG. 3, note that the shopping websites associated with the thumbnails 306 links are configured to reject any foreign shipping address that is not within the geographical shipping boundary of the shopping website. Specifically, each of these independent shopping websites is configured not to ship to certain geographical locations that is outside its geographical boundary. Thus, an advantage of the present invention is that shopping-specific browser 218 facilitates shopping on any one of these sites herein included and facilitates shipping to a foreign address of the shopper.

As noted, each shopping website here is configured not to ship to certain geographical locations. Thus, user 102 residing in Belize, for example, might shop on MACYS.COM™ for example, selecting and placing desired items in a MACY'S shopping cart. However, MACYS.COM™ will thereafter reject any address that is native to Belize. Using an embodiment of the present invention, user 102 can shop on MACYS.COM™ and have the purchased items shipped to Belize.

It is noted that shopping-specific browser 218 is configured to prevent entry of a URL for a shopping website that is not included or aggregated within shopping-specific browser 218. Thus, for example, the user may not enter the address of any other shopping website within address bar 302.

Since many shopping websites display information in different ways, entry of the URL of a shopping website not previously aggregated in shopping-specific browser 218 will cause shopping-specific browser 218 not to recognize or process such website. Once user 102 has launched shopping-specific browser 218 as shown in FIG. 3, user 102 can then select a desired shopping website from the plurality of shopping websites available to conduct online shopping.

In one embodiment, user 102 may access the desired shopping website by selecting the appropriate thumbnail 306 to access the website. In another embodiment, user 102 can select the drop-down bar 304 and highlight the appropriate URL for the website as shown in FIG. 4.

When user 102 selects a desired thumbnail 306 or a link associated with it, main display area 307 displays the shopping website associated with the selected link. For example, selection of thumbnail 306B displays the landing page for WALMART.COM™. Unlike conventional systems, only a single shopping website associated with that link is displayed. User 102 can shop at this single website and other single independent shopping websites associated with each thumbnail 306 of shopping-specific browser 218.

Figure 4:
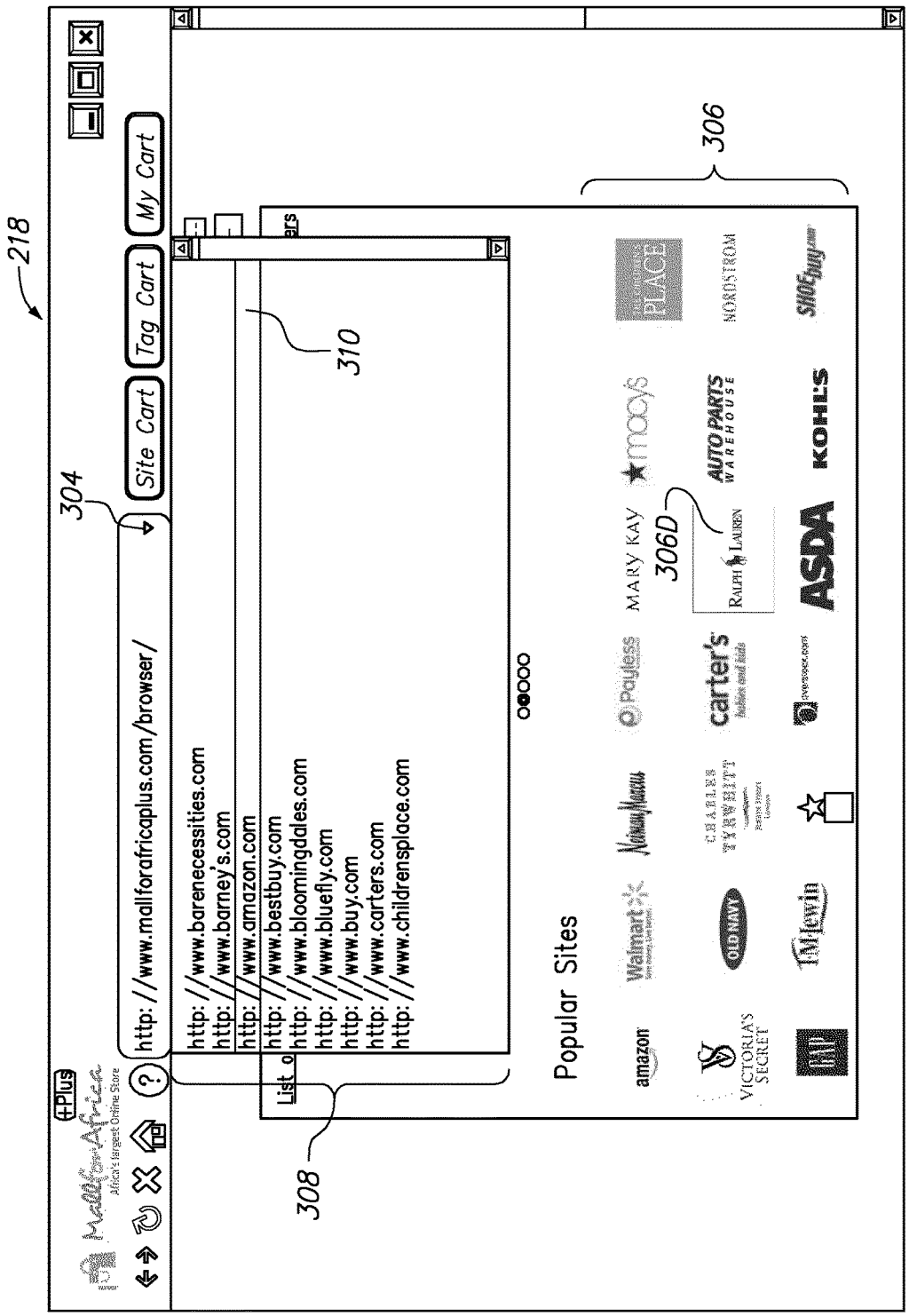
FIG. 4 illustrates a screen shot of a shopping browser according to an exemplary embodiment of the present invention.

FIG. 4 illustrates shopping-specific browser 218 according to an exemplary embodiment of the present invention.

In FIG. 4, user 102 has selected drop-down bar 304 to display a plurality of website URLs 308 that can be accessed by shopping-specific browser 218. As previously noted, access to the shopping websites is predetermined and is incorporated into shopping-specific browser 218. As shown in FIG. 4, user 102 wishes to shop on AMAZON.COM™ and has employed drop-down bar 304 to select this shopping website as further illustrated in FIG. 5.

Figure 5:
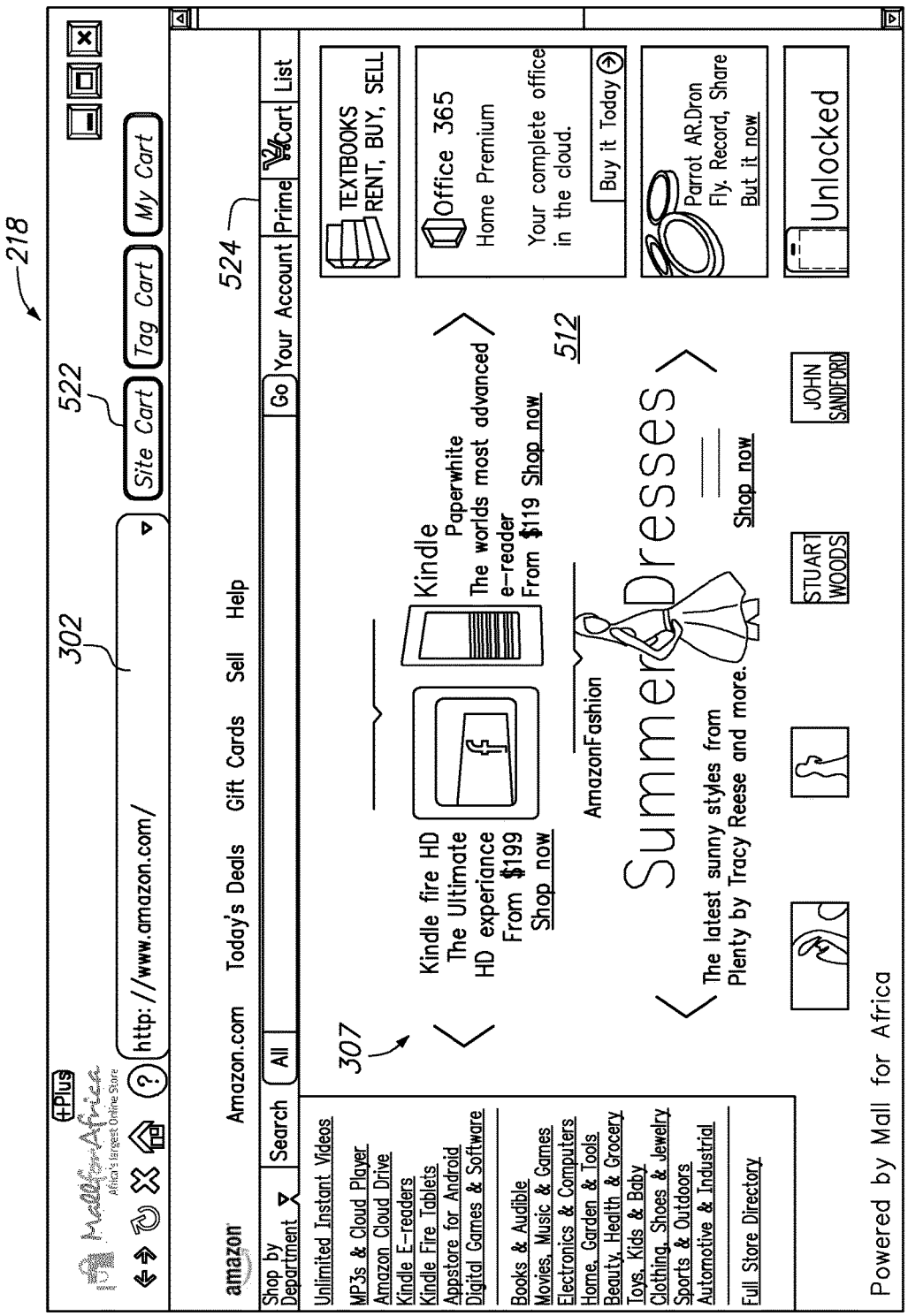
FIG. 5 illustrates a screen shot of a shopping browser displaying a single website according to an exemplary embodiment of the present invention.

FIG. 5 illustrates shopping-specific browser 218 displaying a single website according to an exemplary embodiment of the present invention.

In FIG. 5, based upon user selection, the single website AMAZON.COM™ website 512 is displayed in main display area 307 of shopping-specific browser 218. As can be seen, address bar 302 indicates the URL for AMAZON.COM™; shopping-specific browser 218 requested and is displaying the landing page of AMAZON.COM™ in main display area 307.

Another advantage of the present invention is that any shopping website selected by user 102 is displayed within shopping-specific browser 218 as the shopping website would regularly display with a conventional browser (i.e., without shopping-specific browser 218). Thus, user 102 has flexibility to interact with the website as the user would normally do without shopping-specific browser 218.

Figure 9:
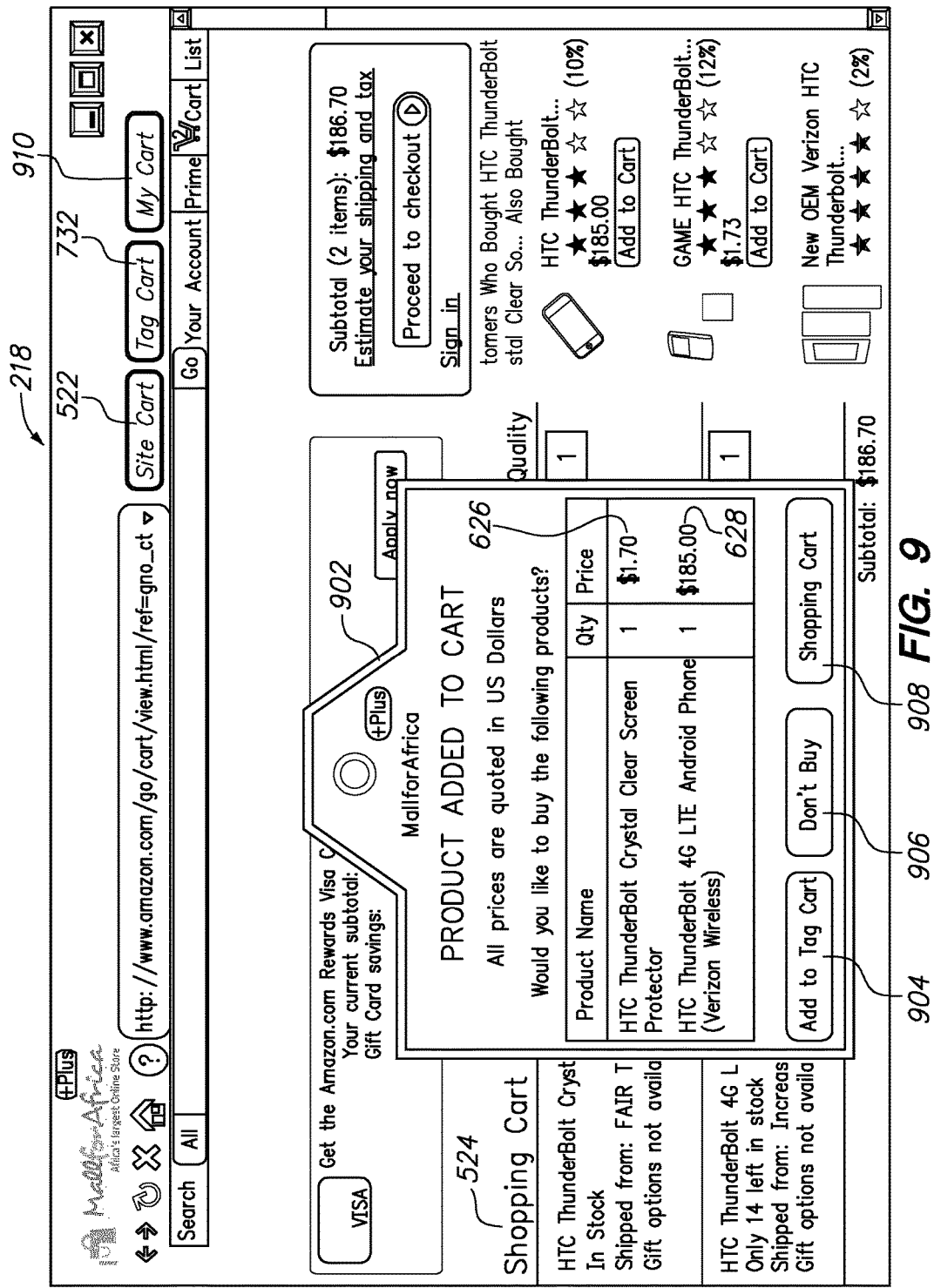
FIG. 9 illustrates a shopping browser displaying an add-to-cart form according to an exemplary embodiment of the present invention.

In one embodiment, as shown in FIG. 5, shopping-specific browser 218 also includes site cart button 522. In an alternate embodiment, a site cart button need not be provided. In such a case, the functionality of the site cart button is provided by tag cart button 732 (FIG. 7) or my cart button 910 (FIG. 9).

In FIG. 5, as user 102 shops on AMAZON.COM™ browsing items, user 102 selects two desired items via a user input device. Here, AMAZON.COM™ accepts signals from user 102 to select the two items that are then placed into AMAZON™ shopping cart 524. When user 102 has completed selection of desired items, user 102 can click site cart button 522 to display a list of selected items in AMAZON™ shopping cart 524 of this single shopping website.

Figure 6:
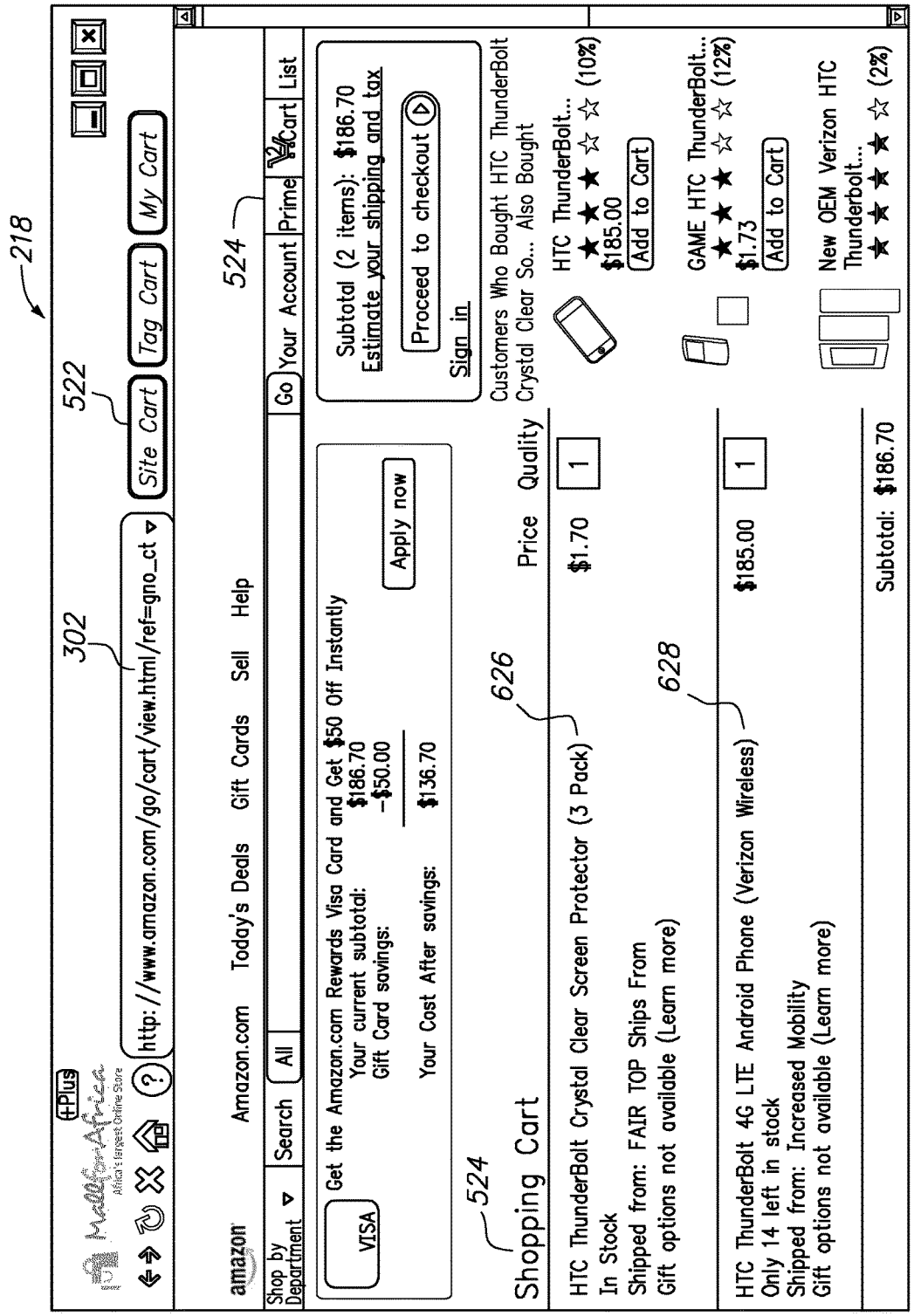
FIG. 6 illustrates a shopping browser responsive to selection of a site cart button according to an exemplary embodiment of the present invention.

FIG. 6 illustrates shopping-specific browser 218 responsive to selection of site cart button 522 according to an exemplary embodiment of the present invention.

In FIG. 6, user 102 has selected site cart button 522 and responsive thereof, a list of items in AMAZON™ shopping cart 524 has been displayed. Specifically, user 102 has placed HTC™ Thunderbolt Crystal Clear Screen Protector (three pack) 626 into AMAZON™ shopping cart 524. User 102 has also placed HTC™ Thunderbolt 4G LTE Android Phone (VERIZON WIRELESS™) 628 into AMAZON™ shopping cart 524.

By selecting the site cart button 522, shopping-specific browser 218 directs the shopping website AMAZON.COM™ to display all of the items in AMAZON™ shopping cart 524. Thus, another advantage of the present invention is that because there are different website payment standards (e.g. for HTML, XML), shopping-specific browser 218 in one embodiment includes functionality or commands to direct shopping websites to display the content of their shopping carts irrespective of the manner of coding associated with those shopping carts.

As can be seen here, shopping-specific browser 218 issues request 630 for the AMAZON™ server to display contents of shopping cart 524 based on user request. After the contents of site cart 524 are displayed, user 102 can select tag cart button 732 of FIG. 7 to initiate the check-out process and to enable addition of the selected items to a third-party shopping cart as further described with reference to FIG. 7.

Figure 7:
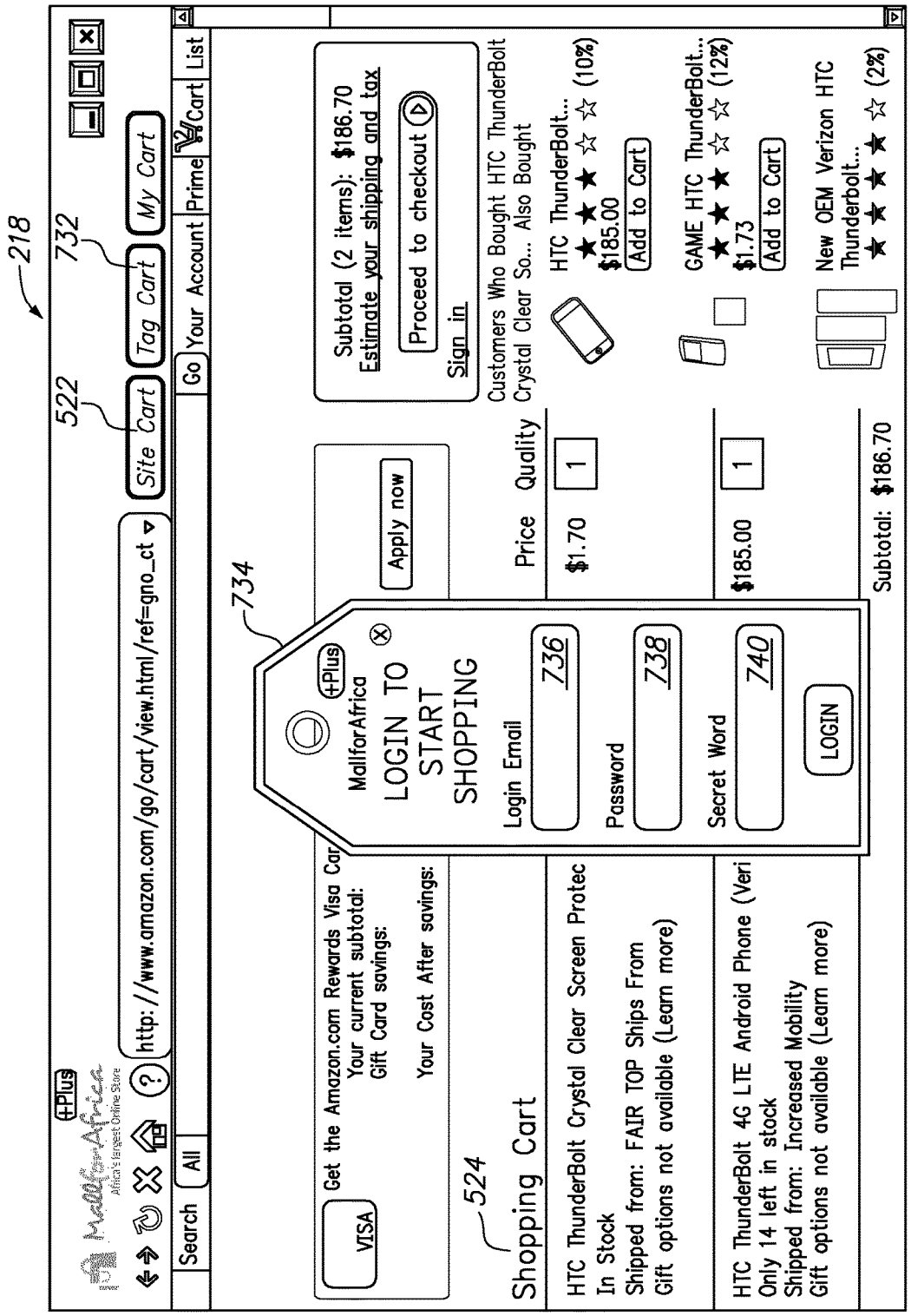
FIG. 7 illustrates a shopping browser displaying an authentication form according to an exemplary embodiment of the present invention.

FIG. 7 illustrates shopping-specific browser 218 displaying authentication form 734 according to an exemplary embodiment of the present invention.

Here, in FIG. 7, user 102 has selected tag cart button 732 to initiate the check out process by tagging the two items for purchase for third-party shopping cart 1002 (FIG. 10) generated by shopping cart module 208 of FIG. 2. However, prior to completing check out, user 102 is authenticated.

Thus, when tag cart button 732 is selected to initiate the check-out process, authentication module 204 (FIG. 2A) in conjunction with client authentication module 220 generates authentication form 734 for authenticating user 102. Authentication form 734 includes various fields; namely login email 736, password 738 and secret word 740.

User 102, having previously registered with global shopping server system 104, can provide the requested information. User 102 authenticates himself or herself by entering the appropriate login email 736, password 738 and secret word 740 to log in and access the user 102 account.

Upon user 102 entering the proper credentials, authentication form 734 is submitted to authentication module 204 of global shopping server system 104. Authentication module 204 authenticates the provided credentials and validates user 102's right to access and determines whether an account exists and if so whether user 102 can access such an account. As noted, such an account may have been previously established as illustrated in FIG. 8.

Figure 8:
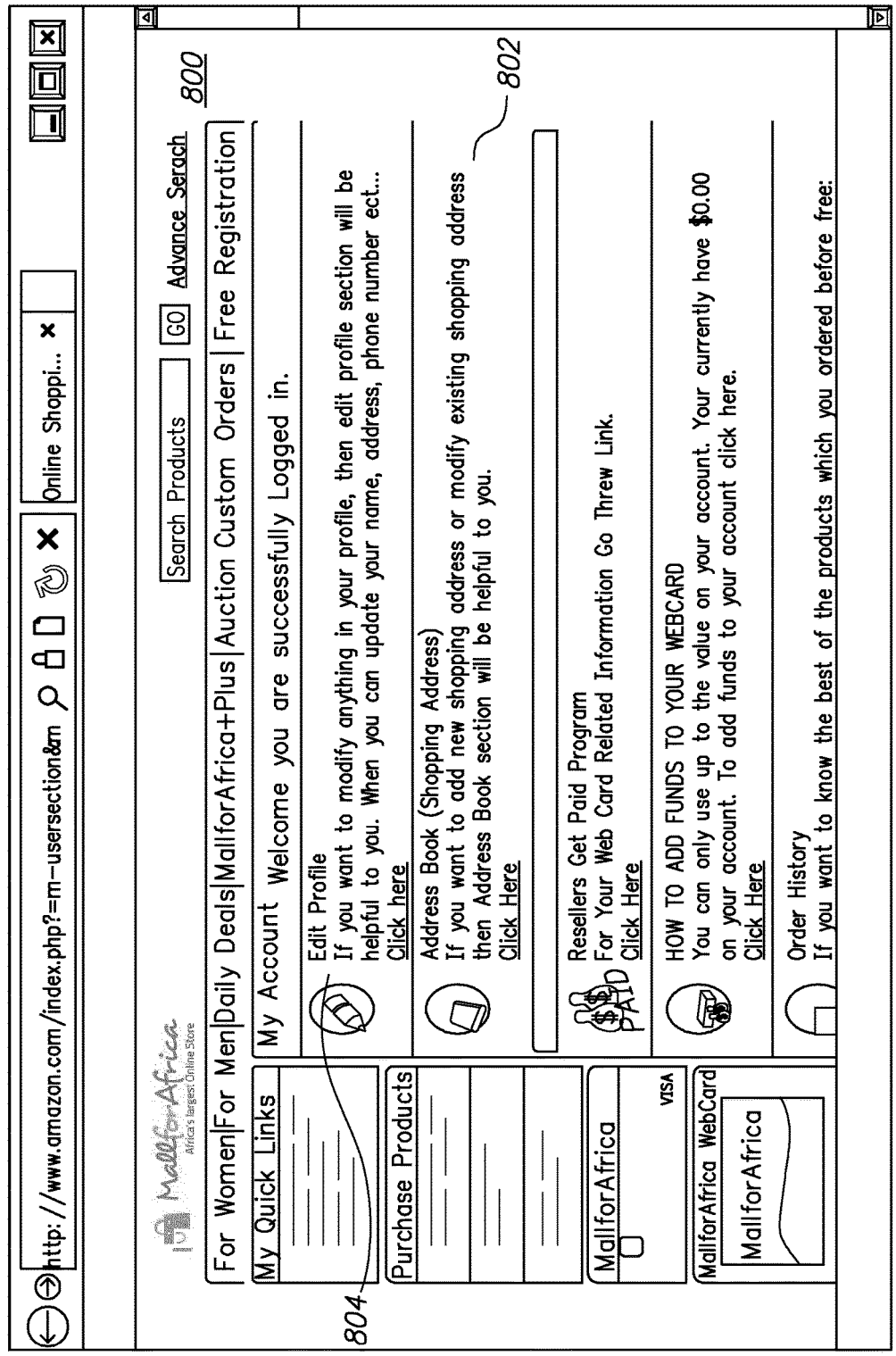
FIG. 8 illustrates an account profile page for a registered user according to an exemplary embodiment of the present invention.

FIG. 8 illustrates an account profile page for registered user 102 according to an exemplary embodiment of the present invention.

In FIG. 8, account profile 800 includes an address book 082 that allows user 12 to enter a shipping address or update an existing one for storage. Such information may be stored in data store 214 (FIG. 2A) or data store 224 (FIG. 2B), for example. The address stored in address book 802 is the foreign shipping address to which all items or goods ordered by user 102 are to be delivered irrespective of the shopping site in which the item or items are ordered.

User 102 can also edit his profile 804 to modify or enter a name, address, phone number or other personal information. Once the user's credentials are validated, add-to-cart form 902 illustrated in FIG. 9 is displayed.

FIG. 9 illustrates shopping-specific browser 218 displaying add-to-cart form 902 according to an exemplary embodiment of the present invention.

In FIG. 9, add-to-cart form 902 displays the two selected items acquired from a merchant website and/or shopping cart, that is, from Amazon shopping cart 524. Add-to-cart form 902 allows user 102 to either add or remove items selected for purchase from merchant websites from third-party shopping cart 102 (FIG. 10) that is generated by shopping cart module 208 (FIG. 2A).

Here, add-to-cart form 902 shows the two selected items HTC™ Thunderbolt Crystal Clear Screen Protectors 626 and HTC Thunderbolt 4G LTE Android Phone (VERIZON WIRELESS™) 628 of FIG. 6 that were previously selected for purchase by user 102. User 102 may then select add-to-tag-cart button 904 to add the selected items to the cart or select don't buy button 906 to decline purchase of the selected items. If items are added to the cart, user 102 may then select Shopping Cart button 908 to generate third-party shopping cart 1002 of FIG. 10.

Figure 10:
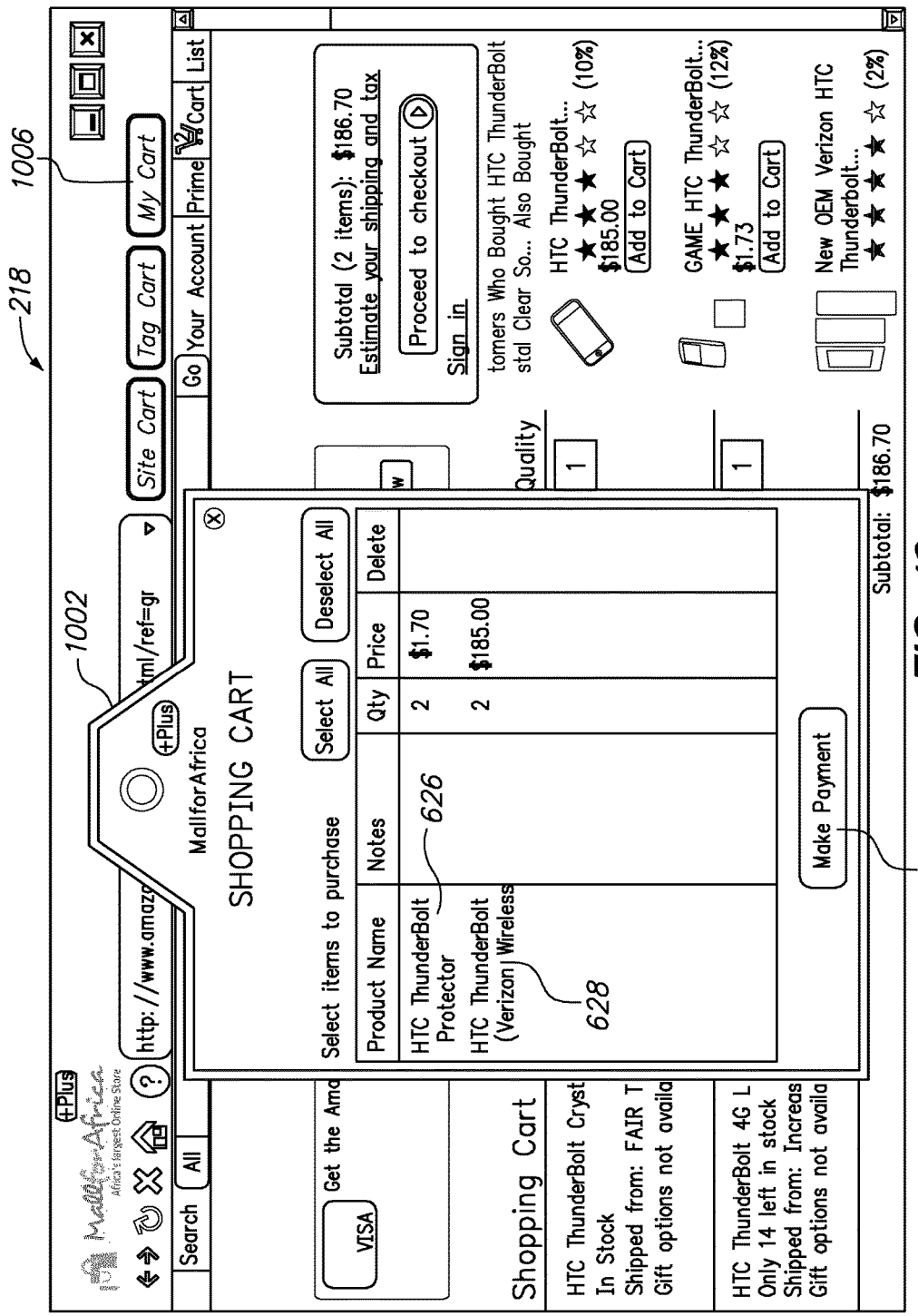
FIG. 10 illustrates a shopping browser showing a third-party shopping cart according to an exemplary embodiment of the present invention.

FIG. 10 illustrates shopping-specific browser 218 showing third-party shopping cart 1002 according to an exemplary embodiment of the present invention.

Here, in FIG. 10, user 102 has selected my cart button 1006 (shopping cart button 908 in FIG. 9) to generate third-party shopping cart 1002. Thereafter, shopping cart module 208 of the commerce module 206 (FIG. 2A) generates third-party shopping cart 1002.

As shown, third-party shopping cart 1002 now includes HTC™ Thunderbolt Crystal Clear Screen Protectors 626 and HTC™ Thunderbolt 4G LTE Android Phone (VERIZON WIRELESS™) 628 that were previously selected in the shopping cart. It also lists the quantity and price of the items and includes make payment button 1004.

User 102 may also choose to select all items to proceed with the transaction or may deselect all items in which case the items are not processed by the shopping cart. In FIG. 10, once the make payment button 1004 is selected, price calculation form 1102 of FIG. 11 is displayed.

Figure 11:
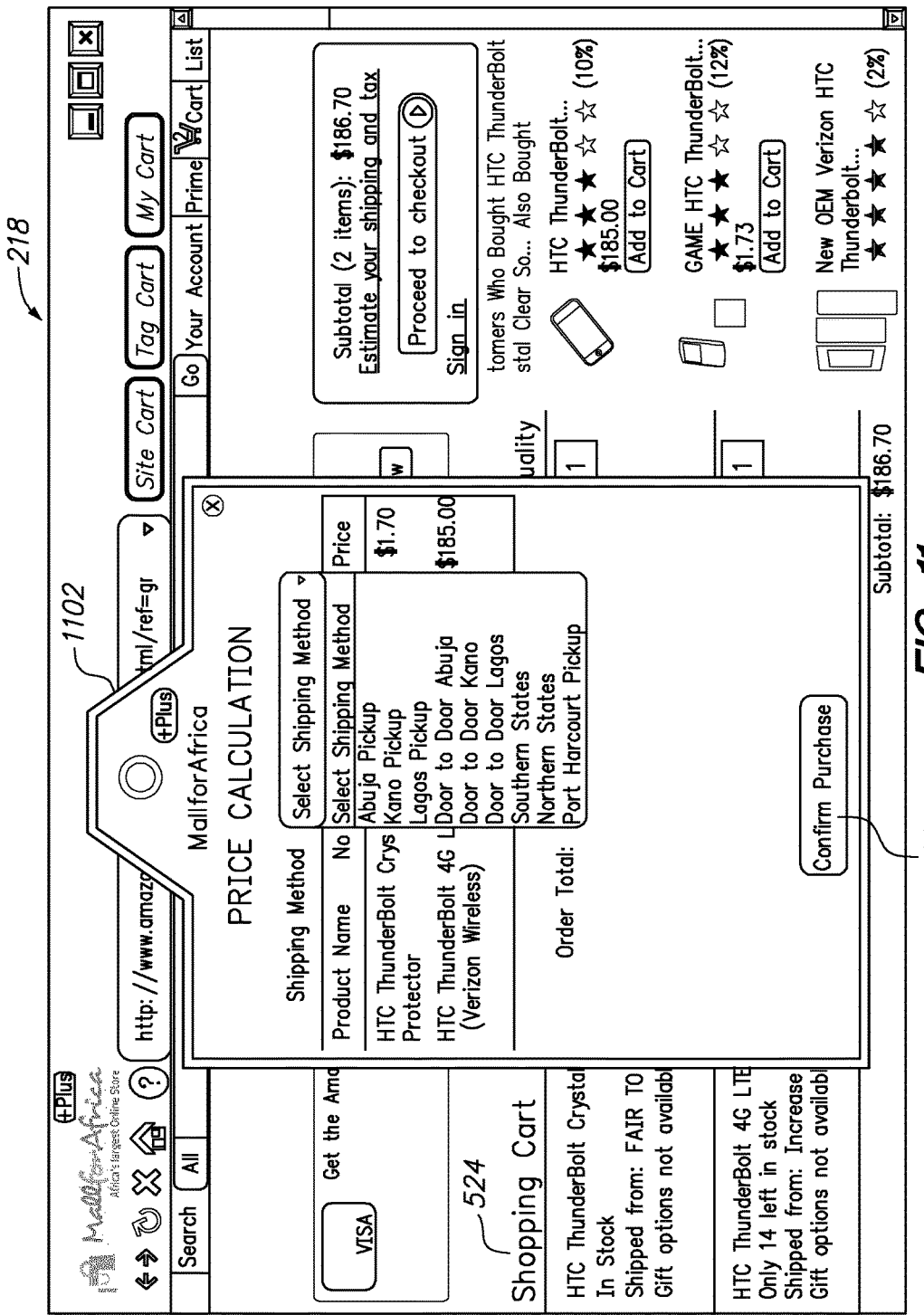
FIG. 11 illustrates a shopping browser displaying a price calculation form according to an exemplary embodiment of the present invention.

FIG. 11 illustrates shopping-specific browser 218 displaying price calculation form 1102 according to an exemplary embodiment of the present invention.

In FIG. 11, price calculation form 1102 generated by payment module 210 (FIG. 2A) determines the product total, duties and handling fees, sales tax, if any, and shipping price depending on the shipping method selected. Users have various shipping options. Users may choose to have purchased items shipped directly to them or may select a proximate location from which the purchased item(s) can be picked up. Proximate locations include Abuja Pickup, Kano Pickup, Lagos Pickup, etc.

Based on any one of these pickup methods, a total price or fee for purchasing items from merchants is calculated. Here, the total price excluding shipping for purchasing the two items from AMAZON.COM™ is calculated at $450.61. Upon selecting confirm purchase button 1106, the place order form 1202 of FIG. 12 is displayed.

Figure 12:
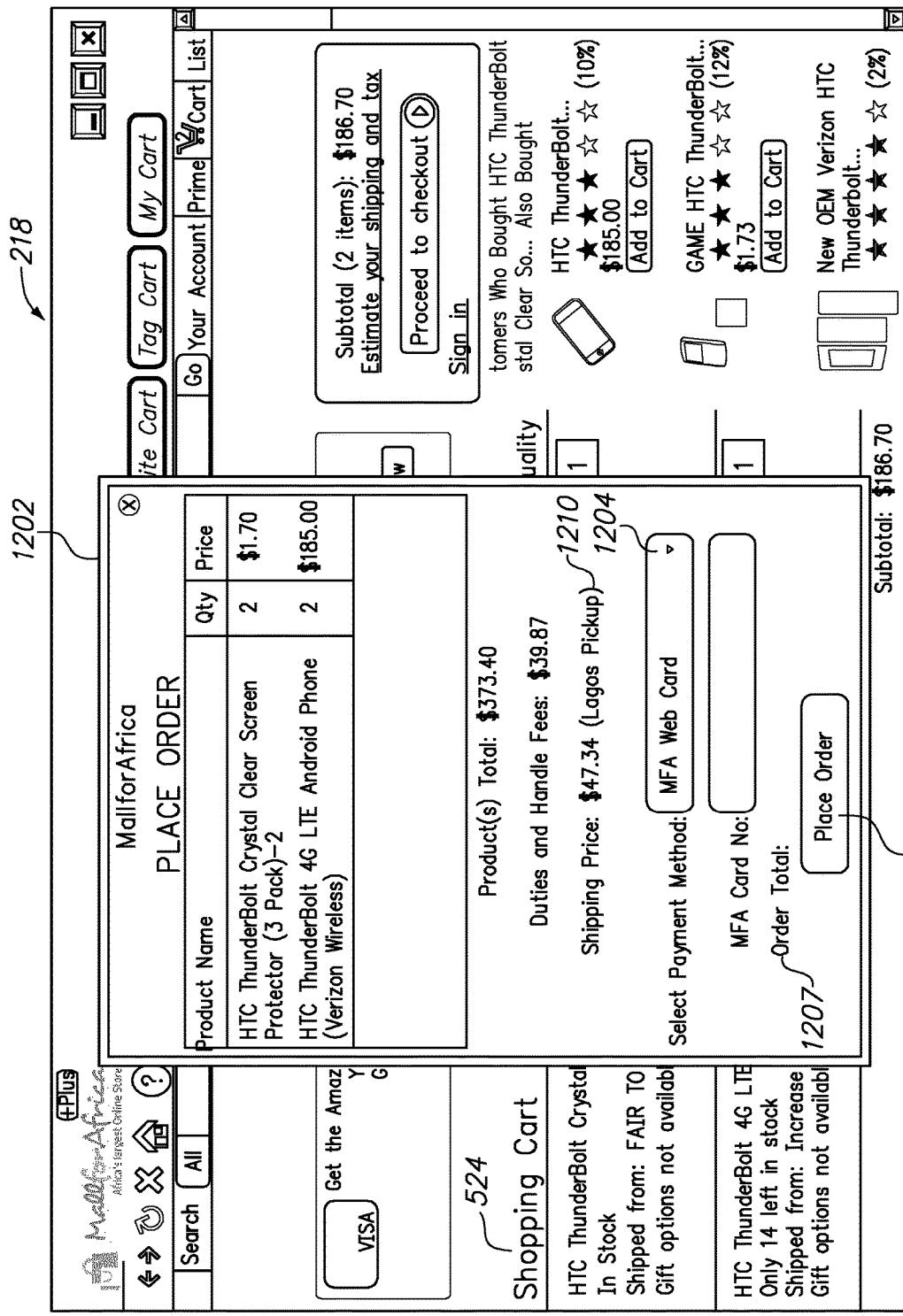
FIG. 12 illustrates a shopping browser showing a place order form according to an exemplary embodiment of the present invention.

FIG. 12 illustrates shopping-specific browser 218 showing place order form 1202 according to an exemplary embodiment of the present invention.

In FIG. 12, user 102 can employ place order form 1202 to calculate a fee for shipping the purchased items from the merchant website (e.g., AMAZON.COM™) to the foreign address or foreign pick up location.

Place order form 1202 also allows selection of a payment method. Specifically, user 102 can select payment drop-down bar 1204 that enables selection of one of various payment types. Based on such selection, order total 1207 is generated. Here, as shown, order total 1207 is $497.95.

Figure 13:
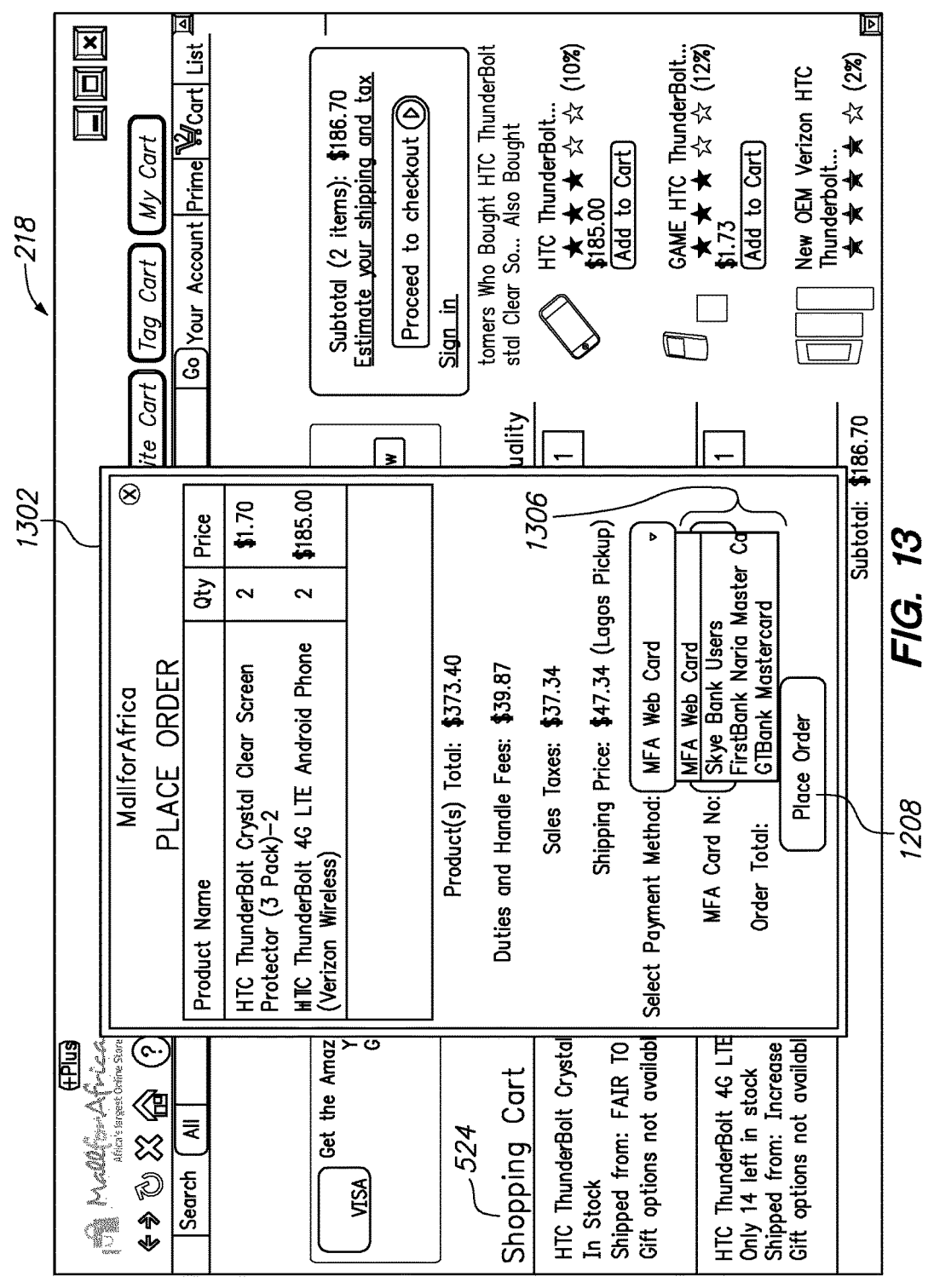

FIG. 13 illustrates shopping-specific browser 218 showing place order form 1302 according to an exemplary embodiment of the present invention.

In FIG. 13, user 102 may use place order form 1302 to finalize the order and select a payment (native to user 102). Payment types 1306 that are native to user 102 are shown. User 102 can choose any of these payment types for payment. Here, user 102 has selected MFA Web Card for payment, and upon selecting the appropriate web card, user 102 selects place order button 1208 (FIG. 12) to place the order.

Once the order is placed, payment module 210 (FIG. 2A) receives the payment and validates the payment before crediting user 102's account with payment. Commerce module 206 then initiates contact with the merchant website, AMAZON.COM™ to complete the transaction by placing an order for the two items purchased by user 102.

Specifically, commerce module 206 places an order for the selected items, namely, HTC™ Thunderbolt Crystal Clear Screen Protector 626 and HTC™ Thunderbolt 4G LTE Android Phone (VERIZON WIRELESS™) 628. For payment, payment module 210 provides a local payment type, namely a payment type that is traditionally accepted by AMAZON.COM™ such as a VISA™ or MASTERCARD™ for payment.

Commerce module 206 also confirms the local shipping address that is on file at AMAZON.COM™. Commerce module 206 also submits a local shipping address that is within the geographical shipping jurisdiction of AMAZON-.COM™. In turn, AMAZON.COM™ then ships the products and ordered items to the local shipping address.

Contemporaneously or after the purchased items are received at the local shipping address, shipping module 212 schedules the shipping of the ordered items from the local shipping address to the foreign shipping address of user 102.

Figure 14:
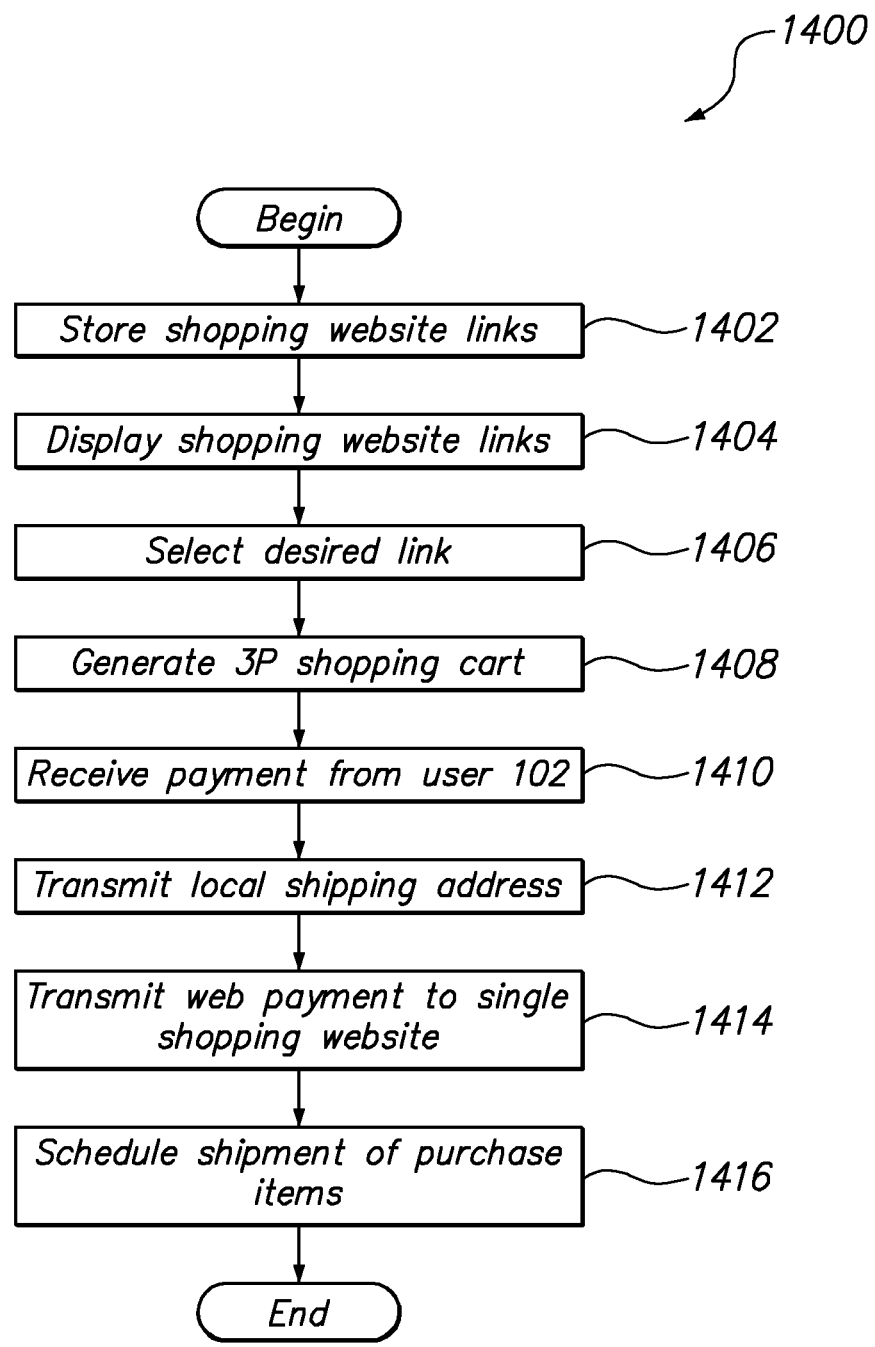
FIG. 14 illustrates an e-commerce shopping method according to an exemplary embodiment of the present invention.

FIG. 14 illustrates e-commerce method 1400 according to an exemplary embodiment of the present invention.

In FIG. 14, e-commerce method 1400 facilitates global online shopping by user 102 (FIG. 1) on a shopping website. The shopping website may be a single predetermined shopping website merchant/website 108 (FIG. 1), merchant/website 110 or merchant/website 112.

In one embodiment, method 1400 is executed by user 102's desktop computing device. In an alternate embodiment, method 1400 might be executed by the desktop computing device in conjunction with global shopping server system 104 (FIG. 2).

At block 1402, at least three aggregated links (or hyperlinks), each one for a shopping website associated with merchant website 108, merchant website 110 and merchant website 112 are stored. The aggregated links might be stored in data store 214 (FIG. 2), data store 224 or memory as a single webpage document for example. Other comparable techniques for data storage may be utilized. Each aggregated link may be an anchor, inline, etc., and can be browsed or navigated by user 102.

Each aggregated link may cause a target document to display in main display area 37 (FIG. 3) or a secondary window. Each aggregated link is also for a shopping website that is coded to reject user 102's foreign shipping address. Thus, after selecting desired items for purchase, if user 102 attempts to enter a shipping address that is beyond the geographical shipping boundary of the shopping website, the shipping address is rejected and the shopping transaction may be discontinued until a valid shipping address is entered.

Preliminarily, before online shopping can begin, user 102 registers for an account and is thereafter issued a payment webcard, unique identification or credit card that is native to user 102's local area. User 102 then deposits funds into the account at a loading station such as a local bank or department store. Global shopping server system 104 then communicates with the loading station and credits user 102's account with the deposited funds. Thereafter, user 102 can then download and launch shopping-specific browser 218 to conduct shopping as described above.

At block 1404, method 1400 involves displaying the aggregated links for the shopping websites on user 102's shopping computer. Specifically, upon launching shopping-specific browser 218, thumbnails 306 associated with the aggregated links are displayed in main display area 307 (FIG. 3).

At block 1406, user 102 selects a link from the aggregated links on main display area 307. In response, a target document, namely the single shopping website associated with the link, is displayed. The single shopping website is independent and generally operates separately from other shopping websites. The single shopping website can receive selections from user 102 desktop computing device to select items that user 102 wishes to purchase. The items for purchase are typically placed in the shopping cart, i.e., shopping cart 524 (FIG. 5) of the website.

At block 1408, method 1400 generates a third-party shopping cart i.e., third-party shopping cart 1002 (FIG. 10) unrelated to shopping cart 524. In one embodiment, the single shopping website may be directed to display the items that user 102 wishes to purchase by selecting site cart button 522 (FIG. 5). In an alternate embodiment, the instruction to display items for purchase is initiated as part of tag cart button 732 (FIG. 7). One skilled in the art will realize that other techniques for displaying purchase items are possible.

Once the items for purchase are displayed, method 1400 acquires and uses the items for sale to populate third-party shopping cart 1002 and to receive and store the foreign shipping address in data store 214 (or 224). Note that third-party shopping cart 1002 can employ this foreign shipping address to calculate a total fee for purchasing the items and for shipping such items to user 102 to his or her foreign shipping address. The foreign shipping address is the final destination of the purchased items.

At block 1410, payment is received from user 102 for the total fee for purchasing and shipping the items from the single shopping website to the foreign shipping address. Here, the payment is a foreign payment type (native to user 102), a web card or the like on which user 102 might have previously loaded funds.

At block 1412, a local shipping address within the geographical shipping boundary of the single shopping website, is transmitted by global shopping server system 104 to the single shopping website. This local shipping address might be a central transitory repository in which items ordered by users globally can be received for subsequent shipping to purchasers. In this manner, users can purchase items from the single shopping website by simply providing their foreign shipping address and not a local shipping address.

At block 1414, method 1400 employs global shopping server system 104 to submit to the single shopping website, a web payment for purchasing the items and for shipping the purchased items to the local shipping address. Here, the web payment might be a local payment type that is typically acceptable to the single shopping website.

At block 1416, a shipment is scheduled to ship the items ordered from the local shipping address or central repository to the foreign shipping address.

Figure 15A:
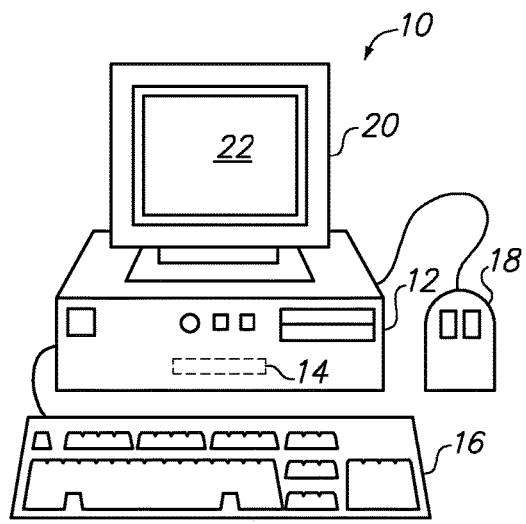
FIG. 15A illustrates a typical computer such as would be operated by a user on the Internet according to an exemplary embodiment of the present invention.

FIG. 15A shows a typical computer 10 such as would be operated by a user on the Internet. Computer 10 includes a cabinet 12 housing familiar computer components such as a processor, memory, disk drive, Compact Digital Read-Only Memory (CDROM), etc. (not shown). User input devices include keyboard 16 and mouse 18. Output devices include display 20 having a display screen 22. Naturally, many other configurations of a computer system are possible. Some computer systems may have other components in addition to those shown in FIG. 15A while others will have fewer components. For example, server computers need not have attached input and output devices since they may only be accessed from time to time by other computers over a network. Human interaction with such a server computer can be at another computer that is equipped with input and output devices. Input and output devices exist in many variations from those shown in FIG. 15A. Displays can be liquid crystal displays (LCD), computer monitors, plasma, etc. Input devices can include a trackball, digitizing tablet, microphone, etc. In general, use of the term "input device" is intended to include all possible types of devices and ways to input information into a computer system or onto a network. Likewise the term "output device" includes all possible types of devices and ways to output information from a computer system to a human or to another machine.

The computer itself can be of varying types including laptop, notebook, palm-top, pentop, etc. The computer may not resemble the computer of FIG. 15A as in the case where a processor is embedded into another device or appliance such as an automobile or a cellular telephone. Because of the ever-changing nature of computers and networks, the description of hardware in this specification is intended only by way of example for the purpose of illustrating the preferred embodiment. Any distributed networked system capable of executing programmed instructions is suitable for use with the present invention.

Figure 15B:
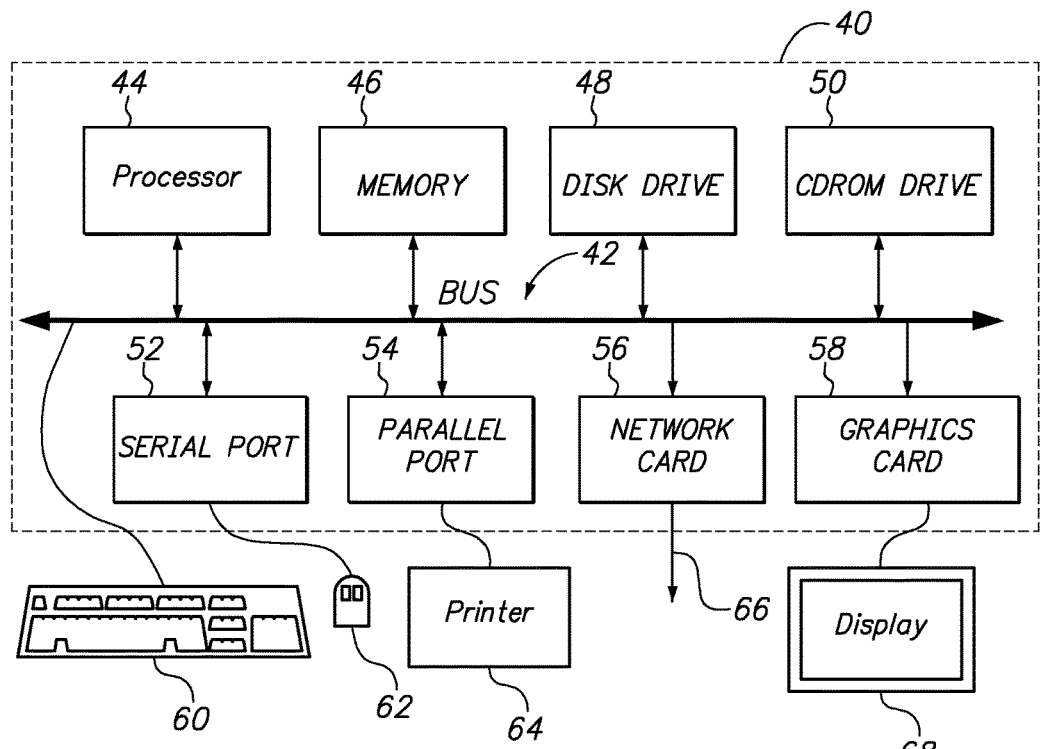
FIG. 15B illustrates shows subsystems of the computer of FIG. 15A according to an exemplary embodiment of the present invention.

FIG. 15B shows subsystems of the computer of FIG. 15A. In FIG. 15B, subsystems within box 40 are internal to, for example, the cabinet 12 of FIG. 15A. Bus 42 is used to transfer information in the form of digital data between processor 44, memory 46, disk drive 48, CDROM drive 50, serial port 52, parallel port 54, network card 56 and graphics card 58. Many other subsystems may be included in an arbitrary computer system, and some of the subsystems shown in FIG. 15B may be omitted. External devices can connect to the computer system's bus (or another bus or line, not shown) to exchange information with the subsystems in box 40. For example, devices such as keyboard 60 can communicate with processor 44 via dedicated ports and drivers (shown symbolically as a direct connection to bus 42). Mouse 62 is connected to serial port 52. Devices such as printer 64 can connect through parallel port 54. Network card 56 can connect the computer system to a network. Display 68 is updated via graphics card 58. Again, many configurations of subsystems and external devices are possible.

While the above is a complete description of exemplary specific embodiments of the invention, additional embodiments are also possible. Thus, the above description should not be taken as limiting the scope of the invention, which is defined by the appended claims along with their full scope of equivalents.

I claim:

1. A method comprising:
executing an application program on a shopping computer, the application program configured to directly conduct e-commerce transactions with a set of predetermined name brand merchant shopping websites with access programmed into said application program, the application program configured to accept two different shipping addresses, a first shipping address from an e-commerce shopper, the first shipping address being a foreign address that is outside the geographical shipping boundary of a merchant website on which said e-commerce shopper is shopping, the application program configured to receive the first shipping address but submit to the merchant website a second shipping address that is different from the first shipping address, the second shipping address being a local address that is within the geographical shipping boundary of the merchant website to which the merchant website can ship purchased goods;
aggregating links for the predetermined set of shopping websites for storage in a data store, wherein the links correspond to shopping websites that cannot ship purchased items to a location of a shopper beyond the geographical shipping boundaries of the shopping websites, wherein the shopping websites are configured to reject or not accept a shipping address for the location of the shopper beyond their geographical shipping boundaries for shipping of an item purchased at the shopping websites;
displaying on the shopping computer, the aggregation of links, wherein upon selection, each of said aggregated link activating a corresponding shopping website including the merchant website or representations thereof of said links for the shopping websites;
receiving links that directly display the merchant website webpage on the shopping computer, the merchant website webpage accepting signals from the shopping computer to select one or more items available for and placing said items in the merchant website shopping cart and using the items from the merchant web site shopping cart to populate the third-party shopping cart;
determining a total payment from the e-commerce shopper for items in the third-party shopping cart wherein said payment is based on the cost of the items acquired from the merchant website shopping cart and on shipping cost to the first shipping address that is foreign to which purchased items are shipped; and
wherein the total payment received from the e-commerce shopper is of a first payment type that is foreign to the merchant website and is not accepted by the merchant website, said application program receiving the first payment type but a second payment type that is local to the merchant website and is accepted by the merchant website is submitted to the merchant website in order to place an order for the items purchased by the e-commerce shopper.

2. The method of claim 1 further comprising scheduling a shipment to ship said items for purchase from the second or local shipping address to the first or foreign shipping address.

3. The method of claim 1 wherein the merchant website is directly accessible via the link without accessing an intermediary website.

4. The method of claim 1 wherein the items are shipped from a merchant website location to the second address, and from the second address to the first address.

5. An e-commerce method, comprising:
receiving a first shipping address from an e-commerce shopper, the first shipping address being a foreign address that is outside the geographical shipping boundary of a single shopping website on which said e-commerce shopper is shopping, although the first shipping address is received, submitting to the single shopping website a second shipping address that is different from the first shipping address, the second shipping address being a local address that is within the geographical shipping boundary of the single shopping website to which the single shopping website can ship purchased goods to;
displaying the aggregation of links for the shopping websites or representations thereof of said links;
generating a display of one or more items for purchase placed in a shopping cart, said one or more items for purchase selected from a single shopping website corresponding to a link activated by selecting one of said aggregation of links;
acquiring the items for sale from the shopping cart of the shopping website;
generating a third-party shopping cart separate from the shopping cart of said single shopping website, and using the one or more items for purchase acquired from the shopping cart to populate the third-party shopping cart;
wherein the third-party shopping cart is configured to receive the first shipping address for a location beyond the geographical shipping boundary of the single shopping website, and the third-party shopping cart is configured to use the first shipping address to calculate a total fee for purchasing the one or more items and for shipping said items from the single shopping website to the shipping address for the location beyond the geographical shipping boundary of the single shopping website; and
receiving payment for the total fee for purchasing the one or more items and for shipping said items from the single shopping website to the first shipping address for the location beyond the geographical shipping boundary of the single shopping website;
wherein the payment for the total fee is a first payment type that is foreign to the single shopping website or is a payment type that is not accepted by the single shopping website, the method receiving said first payment type but submitting to the merchant website a second payment type that is local to the single shopping website or is a payment type that is accepted by the single shopping website in order to place an order for the items purchased by the e-commerce shopper.

6. The method of claim 5 further comprising submitting to the single shopping website, a web payment for purchasing the one or more purchase items and for shipping said items from the single shopping website to the local shipping address, wherein said one or more purchase items are for shipping to the address of location beyond the geographical shipping boundary of the single shopping website.

7. The method of claim 5 further comprising scheduling a shipment to ship said items for purchase from the second or local shipping address to the first shipping address.

8. A computer program product including a non-transitory computer-readable storage medium having computer executable code for e-commerce, the code when executed by a processor is adapted to perform the following:

receive a first shipping address from an e-commerce shopper, the first shipping address being a foreign address that is outside the geographical shipping boundary of a single shopping website on which said e-commerce shopper is shopping, and although the first shipping address is received, submitting to the single shopping website a second shipping address that is different from the first shipping address, the second shipping address being a local address that is within the geographical shipping boundary of the single shopping website to which the single shopping website can ship purchased goods to;

aggregating links for the plurality of shopping websites including the single shopping website, wherein the links correspond to shopping websites that are each configured to reject or not accept shipping addresses for locations beyond their geographical shipping boundaries for shipping of an item purchased at the shopping websites;

displaying the aggregation of links for the shopping websites or representations thereof of said links;

generating a display of one or more items for purchase placed in a shopping cart, said one or more items for purchase selected from a single shopping website corresponding to a link activated by selecting one of said aggregation of links;

acquiring the items for sale from the shopping cart of the shopping website;

generating a third-party shopping cart separate from the shopping cart of said single shopping website, and using the one or more items for purchase acquired from the shopping cart to populate the third-party shopping cart;

wherein the third-party shopping cart is configured to receive the first shipping address for a location beyond the geographical shipping boundary of the single shopping website, and the third-party shopping cart is configured to use the first shipping address to calculate a total fee for purchasing the one or more items and for shipping said items from the single shopping website to the first shipping address; and receiving payment for the total fee for purchasing the one or more items and for shipping said items from the single shopping website to the first shipping address;

wherein the payment for the total fee is a first payment type that is foreign to the single shopping website or is a payment type that is not accepted by the single shopping website, the computer program receiving said first payment type but submitting to the merchant website a second payment type that is local to the single shopping website or is a payment type that is accepted by the single shopping website in order to place an order for the items purchased by the e-commerce shopper.

9. The computer program of claim 8 further comprising submitting to the single shopping website, a web payment for purchasing the one or more purchase items and for shipping said items from the single shopping website to the local shipping address, wherein said one or more purchase items are for shipping to the location beyond the geographical shipping boundary of the single shopping website.

10. The computer program of claim 8 further comprising scheduling a shipment to ship said items for purchase from the local shipping address to the address for the location beyond the geographical shipping boundary of the single shopping website.

* * * * *